UNITED STATES PATENT OFFICE.

JOHN NEPOMUC MOERATH, OF VIENNA, AUSTRIA-HUNGARY.

COMPOSITION OF MATTER FOR COAL-BRIQUETS.

SPECIFICATION forming part of Letters Patent No. 495,679, dated April 18, 1893.

Application filed April 21, 1892. Serial No. 430,136. (No specimens.)

*To all whom it may concern:*

Be it known that I, JOHN NEPOMUC MOERATH, a subject of the Emperor of Austria-Hungary, and a resident of Vienna, Austria-Hungary, have invented a Compound for Coal-Bricks, of which the following is a specification.

Coal bricks as now made, so far as I am aware, possess certain disadvantages; for instance, they become impaired to a greater or less extent by being exposed to varying atmospheres. They often ignite, when warm, by the oxidation of the carbon, this ignition being promoted by the air in the brick or block at the time of its manufacture, which results in the bricks becoming cracked and soft when stored, and thus being open to the action of the atmosphere lose largely their combustive qualities and emit a disagreeable odor when used for household purposes.

By my invention the several objections noted are obviated.

In carrying out my invention, I combine with the coal or carbon material, a special preparation to form an agglomerate mass readily adapted for compression in molding. The special preparation referred to is made by boiling wood moss in a solution of silicic acid to form a viscous liquid, with which is mixed silicic acid dissolved in water, the proportions of which vary according to the quality of the coal material forming the body of the mass. This mass is then formed into bricks or blocks by compression, or otherwise, said bricks or blocks being dampened, dried and then ready for use. Bricks or blocks made according to my invention are not liable to have their combustive properties impaired when stored away. The invention is, therefore, of great importance to brick manufacturers, since it enables them to carry on the manufacture of this article at the most favorable periods. The said bricks made according to my invention are odorless when burned and the quality of the ashes is not affected by the presence of the silicic acid. Coal that is meager in carbon must be warmed before adding the viscous liquid and dissolved silicic acid which, as a matter of fact, forms a binder. Hard coal can stand a comparatively high degree of heat, while with brown coal a temperature of 90° centigrade must not be exceeded.

I claim—

An improved composition consisting of coal dust and a binder composed of a viscous liquid (made by boiling wood moss in silicic acid) and a solution of silicic acid, substantially as set forth.

In testimony whereof I have hereunto set my hand in the presence of two subscribing witnesses.

JOHN NEPOMUC MOERATH.

Witnesses:
W. B. MURPHY,
PAUL BERGER.